United States Patent [19]

Grilk

[11] Patent Number: 4,644,512
[45] Date of Patent: Feb. 17, 1987

[54] SONAR DEPTH FINDER WITH RELATIVE DEPTH LCD DISPLAY

[75] Inventor: Henry G. Grilk, West Milford, N.J.

[73] Assignee: Ketcham & McDougall, Inc., Roseland, N.J.

[21] Appl. No.: 580,914

[22] Filed: Feb. 16, 1984

[51] Int. Cl.$^4$ .......................... G01S 15/96; G01S 7/56
[52] U.S. Cl. .................................... 367/108; 367/111; 367/112; 367/900
[58] Field of Search ................ 367/108, 111, 900, 112

[56] References Cited

U.S. PATENT DOCUMENTS

| | | | |
|---|---|---|---|
| 3,539,978 | 11/1970 | Stedtnitz | 367/108 |
| 3,683,324 | 8/1972 | Hoxsie | 367/900 |
| 3,942,149 | 3/1976 | Westfall, Jr. | 367/111 |
| 4,122,429 | 10/1978 | Hatai | 367/108 |

Primary Examiner—Richard A. Farley
Attorney, Agent, or Firm—Edwin E. Greigg

[57] ABSTRACT

A computer system is proposed for finding and displaying the depth and depth related values of an object in an aquatic environment in which and LCD display is sub-divided into segments each representing a fraction of the total depth range in which the system is operating as well as a fraction of the transit time for the transmission of pulses within the depth range. Each segment is addressed and activated in response to the presence of a receiver output in the microprocessor for a given number of consecutive time-scans, thus providing a quasi-analog visual display of depth on the array of the segmented scale.

13 Claims, 5 Drawing Figures

SONAR DEPTH FINDER WITH RELATIVE DEPTH LCD DISPLAY

BACKGROUND OF THE INVENTION

The invention generally relates to electronic depth finder systems in which depth can be displayed usually by LED's or neon lamps and which a flasher display type of fish finder, depth alarm and scale expanding capabilities are employed. Generally such systems employ analog and digital techniques for processing ultra sonic pulses produced from a transmitter and echoed back from a sea floor or other objects within the travel path of the pulses. The time between the transmitted pulse and an echo or reflection of that pulse has been used to establish a depth quantity value, since the time of travel of the pulse or pulses through water is known.

In addition, such systems generally employ delayed receiver recovery (DRR) techniques, such as "TVG" (Time Varied Gain), "STC" (Sensitivity Time Control), and "SIS" (Subsurface Interference Suppressor), etc. All of these circuits operate on the same principal, namely, reducing the receiver's sensitivity during the transmit period to thereby allow the sensitivity to return to the normal level at a rate that prevents the depth finder from responding to weak echoes caused by minute particles and air bubbles always present in the area just below the surface of any body of water. The goal of these circuits is to prevent the depth finder from responding to false subsurface interference, yet allow it to display true targets. The premise on which these circuits are based is that true targets will yield a stronger return echo than false targets. Although this is generally true, the greater depth of true targets attenuates the echoe's strength. Thus, without a DRR type of circuit, the true/deeper target echo may very well be the same strength or even weaker than the false subsurface echoes. However, a true/shallow target echo will be stronger than false subsurface echoes. Thus, the approach of varying the receiver's sensitivity vs depth is an acceptable approach to reduce this problem.

It should be obvious from the above that optimising the degree to which the sensitivity is reduced and the period over which normal sensitivity is recovered represents a formidable design task. The following is only a short tabulation of the various factors that must be considered:

1. Ultrasonic Frequency
2. Transducer Beam Width
3. Detector Resolution
4. Noise Reject Circuit Delay/Resolution
  a. Bottom Type
  b. Bottom Reflection Co-efficient
  c. Depth of Target
  d. Target Size
  e. Target Relative Density (compared to water)
  f. Target Shape
  g. Presence of Thermoclines
  h. Characteristics of Subsurface False Targets (size, density, etc.)

Of the above tabulation only four factors 1-4 are adjustable by the designer. All other factors a-h are continuously variable. Present conventional circuits are either fixed, where an attempt is made to come up with one level of gain vs time that is applicable to all conditions, or variable where ONE of the critical parameters, such as level of sensitivity reduction or recovery rate is varied by an operator adjusted control.

OBJECTS AND SUMMARY OF THE INVENTION

The invention has for its main object to provide a high resolution multi-reading LCD display, computer controlled depth finder system in which relative depth can be displayed digitally as well, and in which alarm system capability for shallow, deep, fish spotting and anchor watch is provided, as well as a combined depth, speed and water temperature display. Essential to the inventive concept of the present invention is a unique computational feature which allows the time-difference between the transmitted and received pulses to be displayed as depth by means of a quasi-analog segmented scale which simulates the synchronous receipt of pulses reflected from the sea bottom or undersea objects. Thus, there are provided 120 segments of the scale, each of which represents 1/120 of the depth range, which is selected from eight different depth ranges. The separately addressed segments are arranged in a circular pattern and are intended to simulate a conventional "flasher" type of depth finder display but which compensates for turn-on and turn-off delays encountered in conventional systems.

Each segment also represents an amount of time, again depending on the depth range selected, and therefore 120 time slots are represented, each representing 1/120 of the time required for the depth range chosen. The quasi-analog segmented scale (QASS) is updated as frequently as the selected range, digital update rate and period, and microprocessor computation times will allow.

Each QASS update period consists of two parts: the SCAN period of time from when the transmit pulse is generated through the time required for a soundwave to travel to the depth of the selected range and back, plus, the CRUNCH or subsequent period of time after the SCAN required for the microprocessor to perform all necessary calculations and address the LCD drivers accordingly. Between digital update periods there are "n" scans/crunches. The results of each scan are entered into memory in such a way that when the system senses a return echo for a given time-slot, the corresponding memory slot is advanced "1" from "0" to "1". If the next consecutive scan yields no return echo in the same time slot, the corresponding memory slot declines "1" from "1" back to "0". Or if the other consecutive scan does yield another return echo in the same time slot, the corresponding memory slot advances another "1" from "1" to "2". This process continues with succeeding scans and when the memory slot reaches "3" the corresponding QASS segment will turn on. Continued consecutive return echoes in the same time slot will advance the memory slot to a maximum of "7". Thus, each QASS segment will be off when its memory slot contains "2" or less and on if it contains "3" or more. At the completion of the last scan before a digital update period, the LCD QASS continues to display the results of the last scan until the next scan.

In addition, there is provided a fish alarm function for each QASS SCAN in which alarm boundaries are established by "tracking" the bottom depth or continuously redetermining the bottom depth.

The invention also provides for improved resolution and noise immunity in the receiver portion of the system by means of an improved gain level meter, which provides visual indication of the relative gain of the receiver section and thus of its sensitivity, as well as a delayed receiver recovery (DRR) circuit that reduces the receiver's sensitivity during the transmit pulse and allows it to gradually increase back to the normal level.

In particular the DRR circuit used in the present invention varies BOTH the level of sensitivity reduction AND recovery rate. The normal DRR level (level 1) is optimized for most average conditions, but also provided are one level of reduced DRR (level 0), with less sensitivity reduction and faster recovery rate, plus two levels of increased DRR (levels 2 and 3) with progressively greater sensitivity reduction and longer recovery rate. Because the DRR level (sens. reduction & recovery time) is actually a function of the transmit pulse width, which changes with depth range, the optimum level (level 1) automatically varies as a function of the depth range selected. Also, the transmit pulse width is adjustable to any one of four increments, again, level 1=standard pulse width, level 0=shorter pulse width, and levels 2 and 3 progressively longer pulse widths. Thus, considering 8 depth ranges, 4 levels of DRR and 4 levels of transmit pulse width on each range, there are 128 discretely different combinations of sensitivity reduction and recovery rates available. Therefore, regardless of the nature of the subsurface interference (heavy interference but only just below the surface, light interference for great depths below the surface, etc.) there is a level of DRR available that will eliminate responses to false echoes while still responding to true echoes.

An additional improvement of the DRR circuit according to the present invention is the actual circuit configuration and method of varying DRR levels.

These and other objects will become apparent from the ensuing detailed description taken in conjunction with the drawings.

DETAILED DESCRIPTION OF THE DRAWINGS

Figure 1:
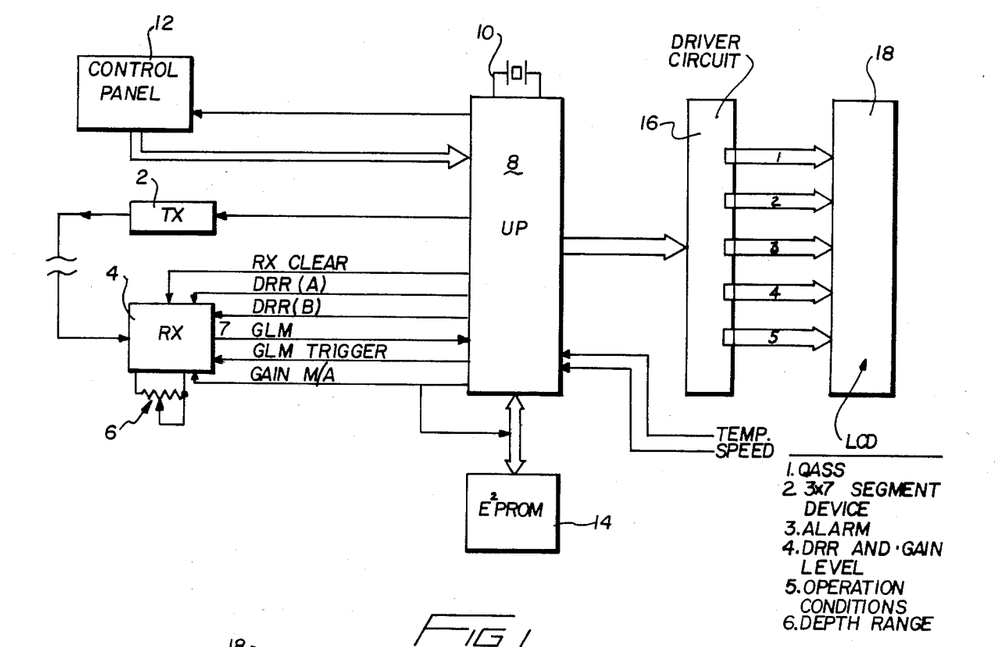
FIG. 1 is a block circuit diagram of the computer control for the transmitter depth finding device and receiver portion of the device according to the invention.

Referring now to FIG. 1, the depth finder system according to the invention is seen to comprise a transmitter 2 which includes a keying stage, an oscillator, and power amplifier none of which are shown since each are of conventional design and readibly available in the market. The transmitter is further connected to a suitable transducer having an operating frequency of 200 KHZ, also not shown, A receiver 4 is shown for receiving the transmitted pulse via the transducer and comprises in turn a buffer stage, high gain amplifier, detector, noise rejection circuit, manual and automatic gain control circuit 6, and a delayed receiver recovery circuit, all to be discussed in greater detail below. In the overall system the receiver's sensitivity is controlled by a bias voltage (Vg) applied to the main receiver high gain amplifier. This voltage, in turn, is controlled by either the manual gain control or the Automatic Gain Control circuit. The selection of either Manual or Automatic Gain Control is determined by the output state of the microprocessor "gain port" (see FIG. 1), where a digital "1"=manual and a digital "0"=automatic.

The receiver section 4 is interfaced via an output 7 with the microcomputer 8, which may be a standard model microprocessor 8050, having 27 lines of input/output, and having a clock frequency whose timing is controlled by a suitable quartz crystal 10. Programming of the microprocessor is accomplished by an EE PROM memory 14, and a control panel 12 is shown for switching on and off the various control functions of the microprocessor in accordance with a desired readout in the liquid crystal display (LCD display) 18. Suitable display driver circuits, 16, with back plane outputs synchronized, are provided as a buffer stage for interfacing the microprocessor 8 with the LCD display 18. The LCD display is shown to have six major areas of display, namely, quasi-analog segmented scale (QASS), 3×7 segment digits, alarm, delayed receiver recovery (DRR) and gain level, operating conditions, and depth range, all of which will be discussed below. In addition a surface (water) temperature interface 20 and a speedometer interface 22 is shown imputted to the microprocessor 8.

In operation the transmitter section 2 produces a burst of 200 KHz signal which is converted into ultrasonic sound waves at a velocity that requires 416.666 (etc.) microseconds to travel down to a depth of one foot and back. Upon receipt of the returning echo, the transducer reconverts the ultrasonic sound-wave back into an electrical signal which is then amplified and detected by the receiver 4. The microprocessor 8 measures the time from initiation of the transmit pulse to receipt of the return echo and causes that time difference to be displayed as depth, both digitally (3×7 segment digits) and via a quasi-analog segmented scale (QASS) 24 (see FIG. 2). There are 120 segments to the QASS, each of which represent 1/120 of the depth range selected. The standard scales provided are 0–12', 0–40', 0–120', and 0–400'. As an example, when in the first range, 0–12', each segment of the QASS 24 represents a depth of 12'/120 or 0.1'. Similarly, in the 40' scale each segment represents 0.33', 120' scale—1', and 400' scale—3.33'. Each segment also represents an amount of time, again, depending on the depth range selected. It takes 5 ms for an ultrasonic signal to travel to a depth of 12' and back, so on the 12' range each segment represents 5 ms/120 or 41.667 microseconds. On the 40' range each segment represents 138.89 ms, 120' scale—416.67 ms and 400' scale—1.3889 ms. Thus, an echo returning from a depth of 13' with the range set to the 40' scale would cause the 39th segment (13'/0.333' per segment) of the QASS to be activated. In all cases the transmit pulse is processed directly through the receiver with no delay causing the 1st segment of the QASS to be activated. The actual transmitted pulse may be somewhat wider than the trigger pulse due to ringing in the oscillator and amplifier tank circuits, plus, transducer ringing. Thus, depending on the resultant actual transmit pulse width and depth range chosen, it may be possible for the pulse to be so wide that the 2nd, 3rd, or more segments are activated. Similarly, the return echo pulse width might also be quite wide depending on transmit pulse width and target characteristics, thus, causing the 40th, 41st, 42nd, or more segments to be activated. The QASS is subdivided into 120 time slots each representing 1/120 of the time required for the depth range chosen. The presence of signals into the receiver will cause the receiver's output 7 to go low (digital 0, normally high or digital 1). The output will stay low for as long as the signal is present and thereafter return to normal high condition. The QASS is updated as frequently as the time between digital update periods and the chosen depth range will allow and responds only to those received signals that have been present in the same time slot for at least 3 consecutive scans. The digital depth display updates approximately once every second (standard; but also, 0.5, 2.0, and 3.0 sec. update rate, see below) and will indicate depth to a resolution level equal to 1/120th of the range selected, i.e., the same resolution as the QASS.

Figure 2:
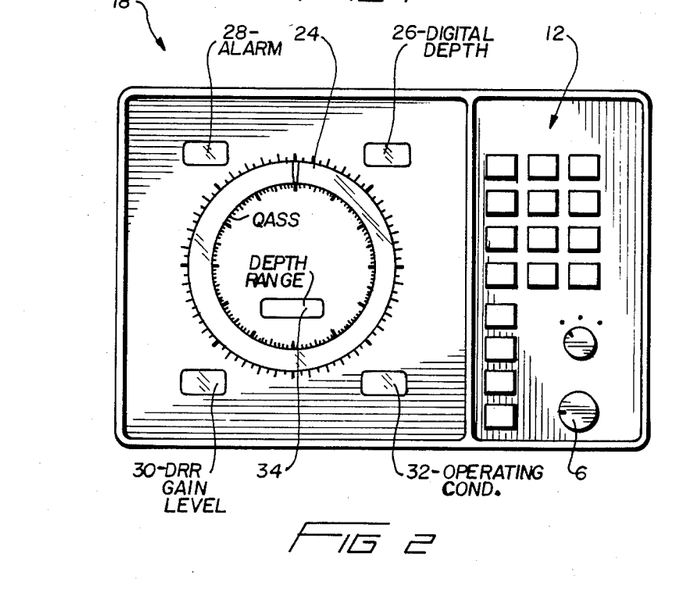
FIG. 2 is a plan view of the control panel and LCD display of the device according to the invention.

As shown in FIG. 2, the QASS 24 (Quasi-Analog Segmented Scale) consists of 119 segments arranged in a circular pattern where each segment is 3 deg. wide×0.525" long with minimum spacing (0.010" max. at outside radius) between segments. With 0 Deg. at the "12 o'clock" position, segment #1 (Q1) is from 0 deg.-3 deg., Q2=3 deg.-6 deg., Q3=6 deg.-9 deg., etc., through Q119=354 deg.-357 deg. The area from 357 deg.-360 deg. (phantom 120th segment) is open to allow access to art in the center of the QASS.

It is the primary objective of this unit to simulate the appearance of a conventional "Flasher Type" depth finder display by using the QASS. The QASS 24 functions at all times that the unit is turned on, operating in the selected range, regardless of other functions operating simultaneously with it and is updated as frequently as the selected range, digital update rate and period, and up computation times will allow.

As an example, assuming 40' range or 16.7 ms for the soundwave to travel to a depth of 40' and back, 25 ms for QASS computation, 50 ms for digital and other function computation, and a one second digital update rate, it should be possible to update the QASS (1.000 sec.-0.050)/(0.017+0.25)=22.6 times or, in practical terms, about 22 times. Each QASS update period consists of two parts; the SCAN or period of time from when the transmit pulse is generated through the time required for a soundwave to travel to the depth of the selected range and back, plus, the CRUNCH or subsequent period of time after the SCAN required for the uP to perform all necessary calculations and address the LCD/drivers accordingly. Thus, between digital update periods there will be "n" number of QASS update periods or "n" number of SCANS/CRUNCHES denoted as (SC1+SC2+SC3+SCn). Each SCAN is further subdivided into 120 equal time slots, each of which is (417×depth range)/120 microseconds long. Each of these time slots corresponds to a QASS segment—time slot 1 to QASS segment 1, slot 2 to segment 2, etc. The results of each scan are entered into the uP RAM in such a way that when a return echo has occurred in a given time slot, the corresponding memory slot is advanced "1" from "0" to "1". If the next consecutive scan yields no return echo in the same slot, the corresponding memory slot declines by "1" from "1" back to "0". Or if the next consecutive scan does yield another return echo in tha same time slot, the corresponding memory slot advances another "1" from "1" to "2". This process continues with succeeding scans and when the memory slot reaches "3" the corresponding QASS segment will turn on.

Continued consecutive return echoes in the same time slot will advance the memory slot to a maximum of "7". Thus, each QASS segment will be off when its memory slot contains "2" or less and on it it contains "3" or more. The following chart illustrates an example:

| Return Echo Present | Memory Slot # | QASS Segment |
| --- | --- | --- |
| no  | 0 | off |
| yes | 1 | off |
| yes | 2 | off |
| yes | 3 | on  |
| yes | 4 | on  |
| no  | 3 | on  |
| yes | 4 | on  |
| yes | 5 | on  |
| yes | 6 | on  |
| yes | 7 | on  |
| yes | 7 | on  |
| no  | 6 | on  |
| no  | 5 | on  |
| no  | 4 | on  |
| no  | 3 | on  |
| no  | 2 | off |
| no  | 1 | off |
| no  | 0 | off |
| yes | 1 | off |
| no  | 0 | off |
| yes | 1 | off |
| yes | 2 | off |
| yes | 3 | on  |
| yes | 4 | on  |
| no  | 3 | on  |

Also shown in FIG. 2 (and at 18 in FIG. 1) is the digital readout for depth 26, consisting of 3×7 segment digits w/D.P. & S—of conventional seven segment digits where the left digit is digit number one (D1), the center=D2, and the right digit=D3. The decimal point is located between D2 and D3 and the letter "S" is located inside the upper half of D1. The individual segments are conventionally identified (clockwise, starting from the top segment, "a" thru "f", with the center segment="g"). Thus, as an example, the bottom segment of the center digit is identified as "D2d". An alarm 28 consists of four "segments" shaped as a shallow arrow, a deep arrow, a fish, and the word "SET", identified as "SA", "DA", "F", and "SET" respectively. DRR and Gain Level indication 30 consists of 11 segments, 3 of which indicate the relative DRR level (DRR-1 thru DRR-3) and the other 8 indiating the relative gain level, G1 thru G8. Operating Condition indication 32 consists of three "segments" in the form of word groups "OVER RANGE" (OR) "NO ECHO" (NE), and RANGE X2 (RX2). Depth Range indication 34 consists of four sets of segments in the form of numbers which represent depth range No. 1(R1), No. 3 (R3), No. 5 (R5), and No. 7 (R7). The LCD Driver circuit 18 consist of 5-33 output LCD drivers (1-5) with back plane outputs synchronized.

The driver circuit 16—LCD segment 18 interconnection is as follows:

| Driver # | Output # | Pin # | LCD Pin # | LCD Segment |
| --- | --- | --- | --- | --- |
| 1 | 1 | 18 | 21 | Q1 |
| 1 | 2 | 17 | 22 | Q2 |
| 1 | 3 | 16 | 23 | Q3 |
| 1 | 4 | 15 | 24 | Q4 |
| 1 | 5 | 14 | 25 | Q5 |
| 1 | 6 | 13 | 26 | Q6 |
| 1 | 7 | 12 | 27 | Q7 |
| 1 | 8 | 11 | 28 | Q8 |

-continued

| Driver # | Output # | Pin # | LCD Pin # | LCD Segment |
|---|---|---|---|---|
| 1 | 9 | 10 | 29 | Q9 |
| 1 | 10 | 9 | 30 | Q10 |
| 1 | 11 | 8 | 31 | Q11 |
| 1 | 12 | 7 | 56 | Q12 |
| 1 | 13 | 6 | 57 | Q13 |
| 1 | 14 | 5 | 58 | Q14 |
| 1 | 15 | 4 | 59 | Q15 |
| 1 | 16 | 3 | 60 | Q16 |
| 1 | 17 | 2 | 61 | Q17 |
| 1 | 18 | 40 | 62 | Q18 |
| 1 | 19 | 39 | 63 | Q19 |
| 1 | 20 | 38 | 64 | Q20 |
| 1 | 21 | 37 | 65 | Q21 |
| 1 | 22 | 36 | 66 | Q22 |
| 1 | 23 | 35 | 67 | Q23 |
| 1 | 24 | 34 | 68 | Q24 |
| 1 | 25 | 33 | 69 | Q25 |
| 1 | 26 | 32 | 70 | Q26 |
| 1 | 27 | 31 | 71 | Q27 |
| 1 | 28 | 30 | 72 | Q28 |
| 1 | 29 | 29 | 73 | Q29 |
| 1 | 30 | 28 | 74 | Q30 |
| 1 | 31 | 27 | 75 | Q31 |
| 1 | 32 | 26 | 76 | Q32 |
| 1 | 33 | 25 | 77 | Q33 |
| 2 | 1 | 18 | 78 | Q34 |
| 2 | 2 | 17 | 79 | Q35 |
| 2 | 3 | 16 | 80 | Q36 |
| 2 | 4 | 15 | 81 | Q37 |
| 2 | 5 | 14 | 82 | Q38 |
| 2 | 6 | 13 | 83 | Q39 |
| 2 | 7 | 12 | 84 | Q40 |
| 2 | 8 | 11 | 85 | Q41 |
| 2 | 9 | 10 | 86 | Q42 |
| 2 | 10 | 9 | 94 | Q43 |
| 2 | 11 | 8 | 95 | Q44 |
| 2 | 12 | 7 | 96 | Q45 |
| 2 | 13 | 6 | 97 | Q46 |
| 2 | 14 | 5 | 98 | Q47 |
| 2 | 15 | 4 | 99 | Q48 |
| 2 | 16 | 3 | 100 | Q49 |
| 2 | 17 | 2 | 101 | Q50 |
| 2 | 18 | 40 | 102 | Q51 |
| 2 | 19 | 39 | 103 | Q52 |
| 2 | 20 | 38 | 104 | Q53 |
| 2 | 21 | 37 | 105 | Q54 |
| 2 | 22 | 36 | 106 | Q55 |
| 2 | 23 | 35 | 107 | Q56 |
| 2 | 24 | 34 | 108 | Q57 |
| 2 | 25 | 33 | 109 | Q58 |
| 2 | 26 | 32 | 110 | Q59 |
| 2 | 27 | 31 | 111 | Q60 |
| 2 | 28 | 30 | 112 | Q61 |
| 2 | 29 | 29 | 113 | Q62 |
| 2 | 30 | 28 | 114 | Q63 |
| 2 | 31 | 27 | 115 | Q64 |
| 2 | 32 | 26 | 116 | Q65 |
| 2 | 33 | 25 | 117 | Q66 |
| 3 | 1 | 18 | 118 | Q67 |
| 3 | 2 | 17 | 119 | Q68 |
| 3 | 3 | 16 | 120 | Q69 |
| 3 | 4 | 15 | 121 | Q70 |
| 3 | 5 | 14 | 122 | Q71 |
| 3 | 6 | 13 | 123 | Q72 |
| 3 | 7 | 12 | 136 | Q73 |
| 3 | 8 | 11 | 137 | Q74 |
| 3 | 9 | 10 | 138 | Q75 |
| 3 | 10 | 9 | 139 | Q76 |
| 3 | 11 | 8 | 140 | Q77 |
| 3 | 12 | 7 | 141 | Q78 |
| 3 | 13 | 6 | 142 | Q79 |
| 3 | 14 | 5 | 143 | Q80 |
| 3 | 15 | 4 | 144 | Q81 |
| 3 | 16 | 3 | 145 | Q82 |
| 3 | 17 | 2 | 146 | Q83 |
| 3 | 18 | 40 | 147 | Q84 |
| 3 | 19 | 39 | 148 | Q85 |
| 3 | 20 | 38 | 149 | Q86 |
| 3 | 21 | 37 | 150 | Q87 |
| 3 | 22 | 36 | 151 | Q88 |
| 3 | 23 | 35 | 152 | Q89 |
| 3 | 24 | 34 | 153 | Q90 |
| 3 | 25 | 33 | 155 | Q91 |
| 3 | 26 | 32 | 156 | Q92 |
| 3 | 27 | 31 | 157 | Q93 |
| 3 | 28 | 30 | 158 | Q94 |
| 3 | 29 | 29 | 159 | Q95 |
| 3 | 30 | 28 | 160 | Q96 |
| 3 | 31 | 27 | 161 | Q97 |
| 3 | 32 | 26 | 162 | Q98 |
| 3 | 33 | 25 | 163 | Q99 |
| 4 | 1 | 18 | 164 | Q100 |
| 4 | 2 | 17 | 165 | Q101 |
| 4 | 3 | 16 | 166 | Q102 |
| 4 | 4 | 15 | 167 | Q103 |
| 4 | 5 | 14 | 168 | Q104 |
| 4 | 6 | 13 | 169 | Q105 |
| 4 | 7 | 12 | 170 | Q106 |
| 4 | 8 | 11 | 171 | Q107 |
| 4 | 9 | 10 | 172 | Q108 |
| 4 | 10 | 9 | 3 | Q109 |
| 4 | 11 | 8 | 4 | Q110 |
| 4 | 12 | 7 | 5 | Q111 |
| 4 | 13 | 6 | 6 | Q112 |
| 4 | 14 | 5 | 7 | Q113 |
| 4 | 15 | 4 | 8 | Q114 |
| 4 | 16 | 3 | 9 | Q115 |
| 4 | 17 | 2 | 10 | Q116 |
| 4 | 18 | 40 | 11 | Q117 |
| 4 | 19 | 39 | 12 | Q118 |
| 4 | 20 | 38 | 13 | Q119 |
| 4 | 21 | 37 | N/C | Phantom Q120 |
| 4 | 22 | 36 | 175 | SA |
| 4 | 23 | 35 | 174 | DA |
| 4 | 24 | 34 | 2 | F |
| 4 | 25 | 33 | 1 | SET |
| 4 | 26 | 32 | 17 | R1 |
| 4 | 27 | 31 | 18 | R3 |
| 4 | 28 | 30 | 19 | R5 |
| 4 | 29 | 29 | 20 | R7 |
| 4 | 30 | 28 | 89 | NE |
| 4 | 31 | 27 | 91 | OR |
| 4 | 32 | 26 | 90 | RX2 |
| 4 | 33 | 25 | 35 | S |
| 5 | 1 | 18 | 36 | D1a |
| 5 | 2 | 17 | 37 | D1b |
| 5 | 3 | 16 | 54 | D1c |
| 5 | 4 | 15 | 55 | D1d |
| 5 | 5 | 14 | 32 | D1e |
| 5 | 6 | 13 | 34 | D1f |
| 5 | 7 | 12 | 33 | D1g |
| 5 | 8 | 11 | 39 | D2a |
| 5 | 9 | 10 | 40 | D2b |
| 5 | 10 | 9 | 51 | D2c |
| 5 | 11 | 8 | 52 | D2d |
| 5 | 12 | 7 | 53 | D2e |
| 5 | 13 | 6 | 38 | D2f |
| 5 | 14 | 5 | 41 | D2g |
| 5 | 15 | 4 | 43 | D3a |
| 5 | 16 | 3 | 45 | D3b |
| 5 | 17 | 2 | 47 | D3c |
| 5 | 18 | 40 | 48 | D3d |
| 5 | 19 | 39 | 49 | D3e |
| 5 | 20 | 38 | 42 | D3f |
| 5 | 21 | 37 | 46 | D3g |
| 5 | 22 | 36 | 50 | DP |
| 5 | 23 | 35 | 131 | G1 |
| 5 | 24 | 34 | 130 | G2 |
| 5 | 25 | 33 | 129 | G3 |
| 5 | 26 | 32 | 128 | G4 |
| 5 | 27 | 31 | 127 | G5 |
| 5 | 28 | 30 | 126 | G6 |
| 5 | 29 | 29 | 125 | G7 |
| 5 | 30 | 28 | 124 | G8 |
| 5 | 31 | 27 | 133 | DRR-1 |
| 5 | 32 | 26 | 134 | DRR-2 |
| 5 | 33 | 25 | 135 | DRR-3 |
| | | | 44,88,132,176 | Back Plane |

There are 8 depth ranges available, 4 major ranges identified ar Ranges 1, 3, 5, & 7, and 4 minor ranges identified as Ranges 2, 4, 6, & 8. Ranges 1 & 3 are programmed into the PROM 14 at the time of manufacture and the other ranges are derived from Ranges 1 and 3 as follows:

| | |
|---|---|
| Range 2 = | 2 × Range 1 |
| Range 4 = | 2 × Range 3 |
| Range 5 = | 10 × Range 1 |
| Range 6 = | 20 × Range 1 (or 2 × Range 5) |
| Range 7 = | 10 × Range 3 |
| Range 8 = | 20 × Range 3 (or 2 × Range 7) |

An optimum transmit pulse width for each depth range is pre-programmed into the PROM 14 as part of the depth range programming code. Generally deeper ranges require longer TX pulse widths while shallow water resolution required shorter TX pulse widths. The purpose of this feature is to allow the operator to select TX pulse widths that deviate from the nominal (optimum) widths initially set for each range as required for special conditions as follows:

| TX Pulse Width Level | TX PW Relative to Nominal |
|---|---|
| 0 | ½ X |
| 1 (standard) | 1 (Nominal) |
| 2 | 1½ X |
| 3 | 2 X |

DIGITAL READOUT OF DEPTH

The digital depth display 26 derives its resolution from the same SCAN mechanism as the QASS depth display, and its resolution is also in steps equal to 1/120th of the selected depth range, rounded off to 0.1 unit if the depth is less than 100'. The digital depth readout displays the depth from the numbers in the memory slots after SCn. Readings less than 1' (where selected range, resolution, transmit pulse width, etc. allow) are displayed with a leading zero preceding the decimal point, such as 0.7, 0.8, 0.9. Readings greater than 1' (with or without decimal point) have leading zero blanking—for example, "3.7", "7.8", etc. The Digital Depth readout is updated in accordance with a variable update rate. The "update rate", as noted above, is the time interval between periods when the digital display is updated with new information. The standard update rate is 1.0 second and is identified as "level 1". Other update rates are:

| Level | Update Rate |
|---|---|
| 0 | 0.5 sec. |
| 1 (standard) | 1.0 |
| 2 | 2.0 |
| 3 | 3.0 |

The purpose of a variable update rate is to allow the operator to select the optimum update rate for a given condition, such as fast update when operating in shallow water to avoid grounding, to slow update for more stable reads at higher boat speeds. Update rate may vary from nominal values noted above for updating other functions, such as, speed, deep water, etc. When the depth is so shallow that a return echo is present at the time the transmit pulse turns off, the digital display 26 indicates "0.0". If the actual depth is greater than the selected range, or if no echo is present, the digital display goes blank. The digital depth readout also displays the depth of the shallowest return echo received.

NO ECHO AND OVER-RANGE

"No echo" condition occurs when the receiver output stays high for 417 ms after a transmit pulse and is an indication of insufficient echo strength due to low sensitivity control level, poor reflection co-efficient of the signal off the bottom, excess depth/path attenuation, etc. An "over range" condition occurs when the actual depth of the target (bottom) is greater than the depth range selected, such that the return echo arrives at the transducer after the Scan period is completed. Initially, both no-echo and over-range conditions present the same symptoms, i.e., no return echo is received during the Scan period. This causes all the QASS memory slots to decrease by one. With each successive Scan where no echo is received, due to no-echo or over-range conditions, all QASS memory slots will continue to decrease until all slots contain the number "0". When all memory slots are "0" the uP 8 recognizes this as a "NO ECHO/OVER RANGE" condition and initiates a NO ECHO/OVER RANGE "*determination*". The NE/OR determination mode consists of a normal transmit pulse followed by a "dead period" equal to the scan time for the selected depth range followed by an "active period" lasting until 417 ms. after the transmit pulse. If a return echo is received after the dead period but before 417 ms has elapsed since the transmit pulse, the uP 8 recognizes the condition as "OVER RANGE", causes the over-range segment on the LCD to come on, and initiates a normal scan. If no return echo is received after the dead period but before 417 ms total elapsed time since the transmit pulse, the uP 8 recognizes the condition as "NO ECHO", causes the no-echo segment 32 on the LCD to come on, and thus initiates a normal scan. If during the nxt normal scan a return is present, the no-echo or over-range segment will turn off, the appropriate memory slot(s) will advance from "0" to "1", and normal scanning will resume. However, if during the next normal scan a return echo is still not present, the uP 8 will again recognize this as a NE/OR condition and initiate another NE/OR determination as noted above while keeping the no-echo or over-range LCD segment 32 on. A no-echo LCD segment "ON", caused by a no-echo condition will stay on until an echo is received, either within or over-range. If the next scan yields a return echo within the selected range, the no-echo LCD segment will stay on while another NE/OR determination scan is made and then the LCD will change from no-echo to over-range.

An over-range LCD segment "ON" caused by an over-range condition will stay on until either an echo is received within the selected range or a no-echo condition occurs. If the next normal scan results in an echo being received within the selected range, (such as if the depth becomes shallower or the operator switches to a deeper range) the over-range LCD segment 32 will go off and normal scanning resumed. If the next normal scan yields no return echo within the selected range, the over-range LCD segment will stay on while another NE/OR determination scan is made and then the LCD will change from over-range to no-echo.

GAIN LEVEL METER

Figure 3:
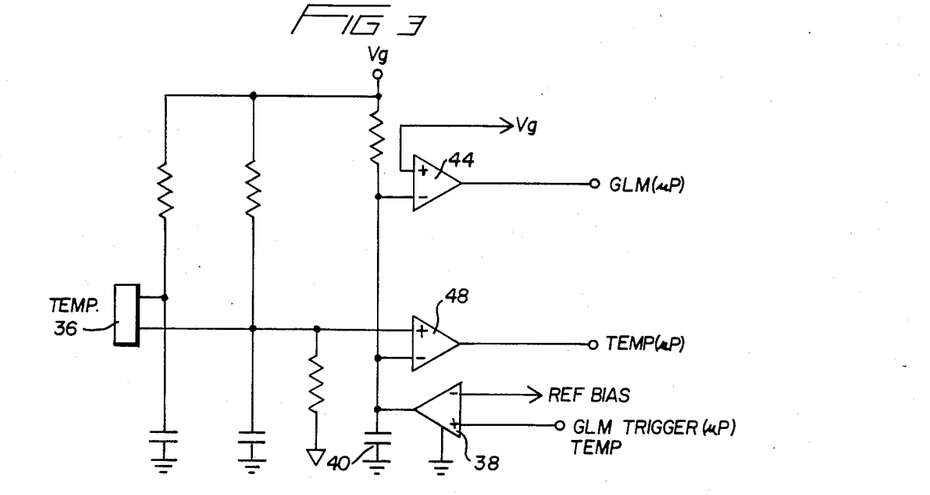
FIG. 3 is a circuit diagram illustrating gain level control and temperature sensing.

The purpose of the gain level meter 30 (GLM) is to provide a visual indication of the relative gain of the receiver section 4 and thus, its sensitivity. The GLM indicates this relative gain in 9 steps, level 0 with all GLM segments off, level 1 with the first GLM segment (G1) on, level 2 with GLM segments G1 and G2 on, etc., through level 8 with all GLM segments (G1 through G8) on. The receiver's gain is a function of, and directly proportional to the bias voltage (Vg) applied to the main receiver high gain amplifier. The GLM interface converts that voltage (Vg) into a pluse where the pulse width is in turn inversely proportional to Vg. The GLM interface consists of two uP ports (see FIG. 1), a trigger pulse output and GLM pulse input. Referring to FIG. 3, the trigger pulse causes the comparator 38 output to discharge the timing capacitor 40. The moment that the trigger pulse ends, the timing capacitor starts to charge at a rate of time determined by the fixed values of the RC network and the applied voltage, Vg. The output of the comparator 44 (uP GLM pulse input) changes state with the trigger pules and returns to quiescent level when the timing capacitor 40 charges to he comparator input reference level. Thus, the pulse width to the GLM input port increases as Vg increases.

The GLM updates after each QASS update period responsive to the gain level set by the manual gain control 6 or established by the AGC circuit depending on whether manual or automatic gain control is functioning.

DELAYED RECEIVER RECOVERY

The DRR (Delayed Receiver Recovery) feature is a circuit that reduces the receiver's sensitivity during the transmit pulse and allows it to gradually increase back to its normal level. Thus, the unit will be less sensitive to return echoes from shallow targets (sub-surface interference) while maintaining normal sensitivity for the return echoes from the true bottom. This feature is the single most critical factor in digital depth finder performance since the digital display indicates the depth of the shallowest return echo. The DRR is settable to one of four levels; level 0 with minimum DRR., or fastest return to normal sensitivity, through level 3 with maximum DRR or slowest return to normal sensitivity. The selection of the DRR level is determined by the output state of the two uP "DRR Ports" (see FIG. 1) as follows:

| DRR Level | LCD DRR Segment "ON" | Digital State of DRR Port A | DRR Port B |
|---|---|---|---|
| 0 | None | 1 | 1 |
| 1 | DRR-1 | 1 | 0 |
| 2 | DRR-2 | 0 | 1 |
| 3 | DRR-3 | 0 | 0 |

Figure 4:
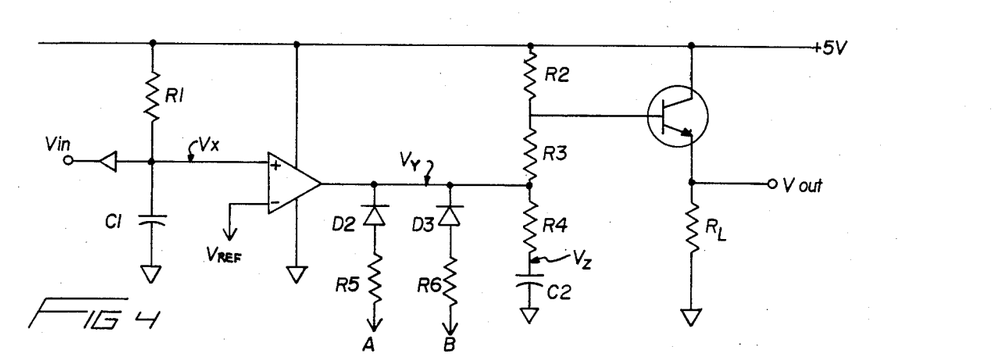
FIG. 4 is a circuit diagram of a DRR circuit for subsurface interference rejection.
Figure 5:
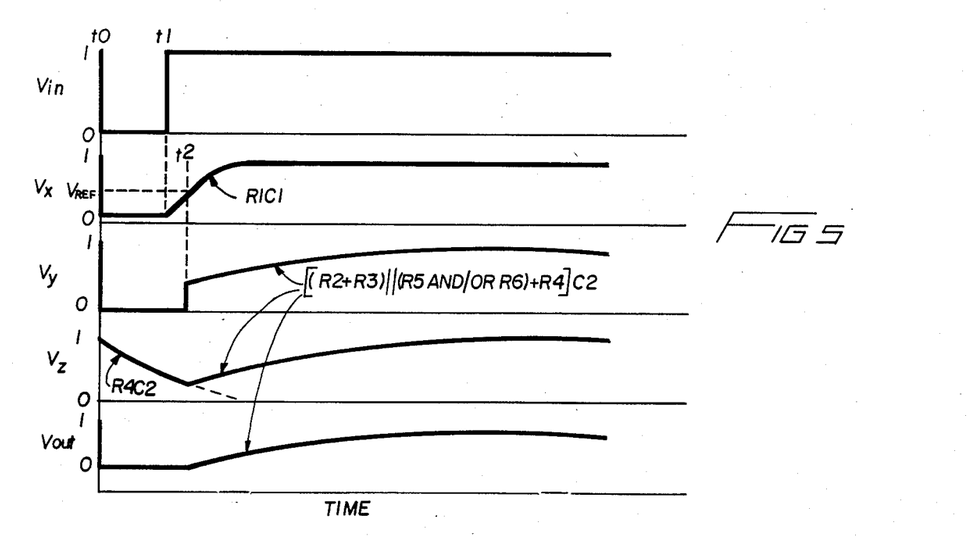
FIG. 5 is a timing diagram for the various voltage values in the DRR circuit.

Referring to FIGS. 4 and 5, a negative going transmit pulse at Vin, of period $t_0 t_1$, is stretched slightly to $t_0 t_2$ by $R_1 C_1$ and IC1. This allows the receiver's gain to be reduced and held at a constant lower level not only for the duration of the transmit pulse, but further enough to compensate for transducer ringing that occurs between $t_1$ and $t_2$. Also during $t_0 t_2$, capacitor, $C_2$ is discharged through resistor R4. Thus, for shallower ranges with shorter transmit pulse widths $C_2$ is discharged less and receiver gain is reduced less. Similarly, for deeper ranges and longer transmit pulse widths $C_2$ discharges more and receiver gain is reduced more. FIG. 5 shows five timing relationships in the DRR circuit for the respective voltages, Vin, Vx, Vy, Vg and Vout shown in FIG. 4.

The rate of gain recovery is governed by the constant of $C_2$ and $R_2$ plus $R_3$ in parallel with $R_5$ and/or $R_6$ depending on DRR level as above (see FIG. 5) and as follows:

| DRR Level | Logic A | Logic B | Total Resistance |
|---|---|---|---|
| 0 | 1 | 1 | $\frac{1}{R2 + R3} + \frac{1}{R5} + \frac{1}{R6}$ |
| 1 | 1 | 0 | $\frac{1}{R2 + R3} + \frac{1}{R5}$ |
| 2 | 0 | 1 | $\frac{1}{R2 + R3} \frac{1}{R6}$ |
| 3 | 0 | 0 | $(R2 + R3)$ |

Thus the receiver's gain (and sensitivity), which is controlled by the bias voltage at Vout, varies to shallow targets as determined by transmit pulse width and DRR level as set by logic levels A & B.

ALARMS

The shallow alarm is an audible alarm which sounds when the depth (transducer to bottom distance) is shallower than the alarm setting. As an example, if the alarm is set to 15' and the water depth is 20' as read on the 40' scale, the audible alarm will be off. When navigating into a shallower area, the audible alarm sounds when the depth becomes 15' or less. Similarly, when navigating back to deeper water, the audible alarm stops sounding when the depth becomes 15.3 feet or more. Specifically, the alarm sounds when the depth is within the time slot (1/120 of selected depth range) that also bounds the chosen alarm setting, or shallower. The audible alarm is off when the depth is within the next deeper time slot than the time slot that bounds the alarm setting, or deeper. A minimum shallow alarm setting can be 1 foot or 4/120 of the selected depth scale, whichever is greater, rounded off to the next higher whole digit. As an example, on the 400' range the min. shallow alarm setting is (4/120) (400)=13.33 or 14'. Also, a maximum shallow alarm setting to be 255 feet or 117/120 of the selected depth scale, whichever is less rounded off to the (lower) whole digit and can be adjusted for the different standard depth ranges.

The deep alarm is an audible alarm which sounds when the depth is deeper than the alarm setting. It functions in a manner similar to but inversely from the shallow alarm. Specifically, the alarm sounds when the depth is within the time slot (1/120 of selected depth range) that also bounds the chosen alarm setting, or deeper. The audible alarm is off when the depth is within the next shallower time slot than the time slot that bounds the alarm setting, or shallower. A minimum deep alarm setting can be 2 ft. or 8/120 of the selected depth scale, whichever is greater, rounded off to the next higher whole digit and can be adjusted for the different standard ranges.

Also provided is an "*ANCHOR ALARM*" or simultaneous operation of shallow and deep alarms. This form of operation takes place when it is desired to set a "guard band" where the alarm sounds if the boat drifts or navigates into water that is deeper or shallower than the setting limits of the guard band. In this case all minimum and maximum alarm setting limits noted above apply. However, two additional conditions apply. Obviously, it is not possible to set the shallow alarm deeper than the deep alarm and visa versa, and the minimum guard band, or separation between shallow and deep alarm settings, must be 1 foot or 4/120 of the selected depth scale, whichever is greater, rounded off to the next higher whole digit.

The purpose of the Fish Alarm 28 is to visually and audibly indicate the presence of intermediate targets (fish) between the "water surface" (actually some minimum fixed depth below the transducer) and the bottom, or some minimum fixed distance above the bottom. This requires "tracking" of the bottom depth or constantly redetermining the depth of the bottom so that the alarm boundries are established. The fish alarm updates each scan instead of during the digital update period, and the following events occur during EACH QASS SCAN after the fish alarm has been activated: The shallowest memory slot with a "4" or greater becomes the "new bottom". The upper fish alarm boundry (shallow boundry) is 1' or 4/120 of the selected depth range, whichever is greater, while the lower fish alarm boundry (deep boundry) is 1' or 4/120 of the selected depth range, whichever is greater, above the "old bottom" which is the bottom determined on the last previous scan. The Fish Alarm sounds when any memory slot between the shallow and deep boundries increases to "3". Once triggered, the Fish Alarm will sound, and the QASS segment corresponding to that memory slot will turn on and stay on for a period of three seconds. When the Fish Alarm is triggered the "fish" memory slot is cleared back from "3" to "0" and becomes inhibited until the Fish Alarm ceases sounding. In the event that a given scan results in simultaneous memory slots between the shallow and deep boundries increasing to "3", each is processed as above.

SPEED AND TEMPERATURE

The purpose of the Speedometer feature is to provide a digital readout of boat speed, using two of the three 7 segment digits. The Speedometer interface consists of one uP port (see FIG. 1) and a pulse shaping network; the sender of known design generates pulses at a rate of 20, 500 pulses per nautical mile (approx. 17,800 pulses per statute mile or 11,064 pulses per kilometer) and the uP 8 calculates speed from the pulse spacing. the LCD segment "S" is activated when the speedometer feature is in use. Speed calibration can be pre-programmed into the PROM 14.

The purpose of the Surface Temperature feature is to provide a dgital readout of water surface temperature, using the three 7 segment digits (D1, 2, and 3), to a resolution of ±1 deg. F or 1 deg. C. This feature requires an optional temperature sensing head 36 (thermistor). The temperature interface consists of two uP ports, a trigger pulse output (which may be common to the GLM trigger pulse output port, see FIG. 1 and FIG. 3, and a temperature pulse input port. Referring again to FIG. 3, the trigger pulse causes the comparator 38 output to discharge the timing capacitor 40. The moment that the trigger pulse ends, the timing capacitor starts to charge at a rate of time determined by the values of the RC network containing the thermistor temperature sensor 36. The output of the comparator 48 (uP temperature pulse input port) changes state with the trigger pulse and returns to quiescent level when the timing capacitor charges to the comparator input reference level. Since the thermistor has a negative temperature coefficient, the pulse width to the temperature pulse input port increases as temperature increases.

The uP 8 (and/or PROM 14) have calibration factors for displaying temperature in degrees F. when depth is displayed in "feet" and speed in "MPH" or degrees C. when depth is displayed in "meters" and speed in "KPH". LCD segment digits D1 and D2 are used to display temperature and digit D3 the units of measure; for degrees F., segments D3a, D3e, D3f, and D3g; for degrees C., segments D3a, D3d, D3e, and D3f. The uP 8 is capable of displaying temperature from 32–99 degrees F. and from 0–40 degrees C. (leading zero blanking on 1-9 degrees C. and "0" at 0 degrees C.).

Except for the fish alarm and GLM functions which update each scan, the above functions are updated during the digital update period based on information stored in the memory slots in the PROM 14 after scan SCn.

The control panel 12 houses suitable control switches for activating the various functions described above including power on and off. Also, operating procedures, which form no part of the invention, can be employed for activating the various functions in whatever desired sequence in relationship with respect to operating conditions present at the time of use of the depth finder device, according to the invention. It is also to be understood that manual and automatic reset functions are suitably provided, as is well known in the art, for stopping and starting programming or returning to a previous condition.

The foregoing relates to a preferred embodiment of the invention, it being understood that other embodiments and variants thereof are possible within the spirit and scope of the invention, the latter being defined by the appended claims.

What is claimed and desired to be secured by letters patent of the United States is:

1. A method for finding and displaying the depth and depth related values of an object in an aquatic environment including a device having a transmitter for transmitting pulses, a receiver for receiving said pulses echoed from said object, processing means for programming and computing the transit time of said pulses in terms of a given range of depth and for addressing an LCD display having a segmented scale for visualizing said depth, comprising the steps of programming each segment of said segmented scale to represent (1) a fraction of a total range of depth and (2) a corresponding fraction of a time-scan for the transmission of said pulses within said range of depth, updating said LCD display at a given rate and period to effect N number of scans of the transit time of said pulses between update periods, storing the results of each scan into memory slots in said processing means which correspond in number to the number of segments in said segmented scale, activating certain of said segments of said segmented scale in response to the presence of a receiver output in the same memory slot for a predetermined number of consecutive scans, varying the transmitter pulse width to selected values, reducing the receiver sensitivity to a constant level below a given value in response to variations of transmitter pulse width during transmission thereof, and varying the receiver recovery rate back to said given value to thereby reject subsurface interference from said aquatic environment in said receiver.

2. A method according to claim 1, wherein said predetermined number of scans is dependent on a selection of said given range of depth and a selection of said updating rate.

3. An apparatus for finding and displaying the depth and depth related values of an object in an aquatic environment, comprising a transmitter for transmitting pulses, a receiver for receiving said pulses echoed from said object, a processing means for computing the transit time of said pulses in terms of a given range of depth, said processing means including scanning means for effecting n number of scans of the transit time of said pulses, and a memory means for storing the results of each of said n number of scans, said memory means including memory slots corresponding in number to the number of segments in said segmented scale, an LCD display connected to said processing means having a segmented scale for visualizing said depth, means connected to said processing means for addressing each individual segment of said segmented scale of said LCD display, means for activating certain of said segments in response to a receiver output to said processing means, and means for advancing said memory slots incrementally from "1" to "7" for each scan in which there is a receiver output in said processing means, such that said certain of said segments of said segmented scale are "off" when said corresponding memory slots are "2" and less and "on" when said corresponding memory slots are "3" and more.

4. An apparatus according to claim 3, wherein said segments of said LCD display are arranged in a circular pattern.

5. An apparatus according to claim 3, wherein said processing means includes a digital update means, and said LCD display includes a digital display.

6. An apparatus according to claim 3, wherein said processing means includes a depth range indicator.

7. An apparatus according to claim 3, wherein said segmented scale of said LCD display comprises 120 of said segments, each said segment representing 1/120 of the time required for the transmission of said pulses within said depth range.

8. An apparatus according to claim 3, wherein said segmented scale of said LCD display comprises 120 of said segments, each said segment representing 1/120 of the depth of said depth range.

9. An apparatus according to claim 3, further comprising a delayed receiver recovery circuit having a first means for reducing the sensitivity of said receiver from a given level during transmission of said transmitter pulses, and a second means responsive to said processor means for varying the rate of recovery of said receiver back to said given level.

10. An apparatus according to claim 9, wherein said first means comprises an RC circuit.

11. An apparatus according to claim 9, wherein said second means comprises an RC circuit, the time constants of which control the rate of gain of recovery of the sensitivity of said receiver back to said given level.

12. An apparatus according to claim 11, wherein said processing means selects a given total resistance from a resistance means for said RC circuit.

13. An apparatus according to claim 9, further comprising means for varying the transmitter pulse width.

* * * * *

UNITED STATES PATENT AND TRADEMARK OFFICE
CERTIFICATE OF CORRECTION

PATENT NO. : 4,644,512

DATED : February 17, 1987

INVENTOR(S) : Henry G. GRILK

It is certified that error appears in the above-identified patent and that said Letters Patent are hereby corrected as shown below:

On the title page assignee should read:

--[73] Assignee: AQUA METER INSTRUMENT CORPORATION, Roseland, New Jersey--.

Signed and Sealed this

Third Day of May, 1988

Attest:

DONALD J. QUIGG

Attesting Officer

Commissioner of Patents and Trademarks